US010246165B2

(12) United States Patent
Busson

(10) Patent No.: US 10,246,165 B2
(45) Date of Patent: Apr. 2, 2019

(54) DISMANTLABLE LINK, SUITABLE IN PARTICULAR FOR INTERCONNECTING TWO CHAINS FOR ANCHORING FLOATING EQUIPMENT TO THE GROUND

(71) Applicant: NOV-BLM, Carquefou (FR)

(72) Inventor: Philippe Busson, Saint-Herblain (FR)

(73) Assignee: NOV-BLM, Carquefou (FR)

( * ) Notice: Subject to any disclaimer, the term of this patent is extended or adjusted under 35 U.S.C. 154(b) by 0 days.

(21) Appl. No.: 15/541,581

(22) PCT Filed: Jan. 5, 2016

(86) PCT No.: PCT/FR2016/050007
§ 371 (c)(1),
(2) Date: Jul. 5, 2017

(87) PCT Pub. No.: WO2016/110638
PCT Pub. Date: Jul. 14, 2016

(65) Prior Publication Data
US 2018/0001967 A1 Jan. 4, 2018

(30) Foreign Application Priority Data

Jan. 8, 2015 (FR) .................................... 15 50133

(51) Int. Cl.
| | |
|---|---|
| *F16G 13/14* | (2006.01) |
| *B63B 21/20* | (2006.01) |
| *F16G 15/02* | (2006.01) |
| *B63B 21/50* | (2006.01) |
| *F16G 11/03* | (2006.01) |

(52) U.S. Cl.
CPC ............ *B63B 21/20* (2013.01); *B63B 21/502* (2013.01); *F16G 13/14* (2013.01); *F16G 15/02* (2013.01); *F16G 11/03* (2013.01)

(58) Field of Classification Search
CPC ....... B63B 21/20; B63B 21/502; F16G 13/14; F16G 15/02; F16G 11/03
USPC .............................................................. 59/85
See application file for complete search history.

(56) References Cited

U.S. PATENT DOCUMENTS

| | | | |
|---|---|---|---|
| 2,347,088 A | 4/1944 | Russell | |
| 2,693,673 A * | 11/1954 | Lutts ...................... | F16G 13/14 59/84 |
| 2,731,791 A | 1/1956 | Dock | |
| 5,345,754 A * | 9/1994 | Deramaux ............ | F16B 7/0426 59/30 |

(Continued)

FOREIGN PATENT DOCUMENTS

GB          620 330 A       3/1949

OTHER PUBLICATIONS

International Search Report, dated Apr. 12, 2016, from corresponding PCT/FR2016/050007 application.

*Primary Examiner* — David B Jones
(74) *Attorney, Agent, or Firm* — Young & Thompson

(57) ABSTRACT

Disclosed is a demountable link, suitable in particular for interconnecting two chains for anchoring floating equipment to the ground. This demountable link, shaped like an oblong ring, includes two straight sections connected by two curved sections, and includes: —two side parts each forming one of the curved sections, and—two connecting parts, each forming at least one portion of one of the straight sections, the side parts being assembled with the connecting parts, through removable fastening unit.

15 Claims, 5 Drawing Sheets

(56) References Cited

U.S. PATENT DOCUMENTS

2018/0001967 A1\* 1/2018 Busson .................. B63B 21/20

\* cited by examiner

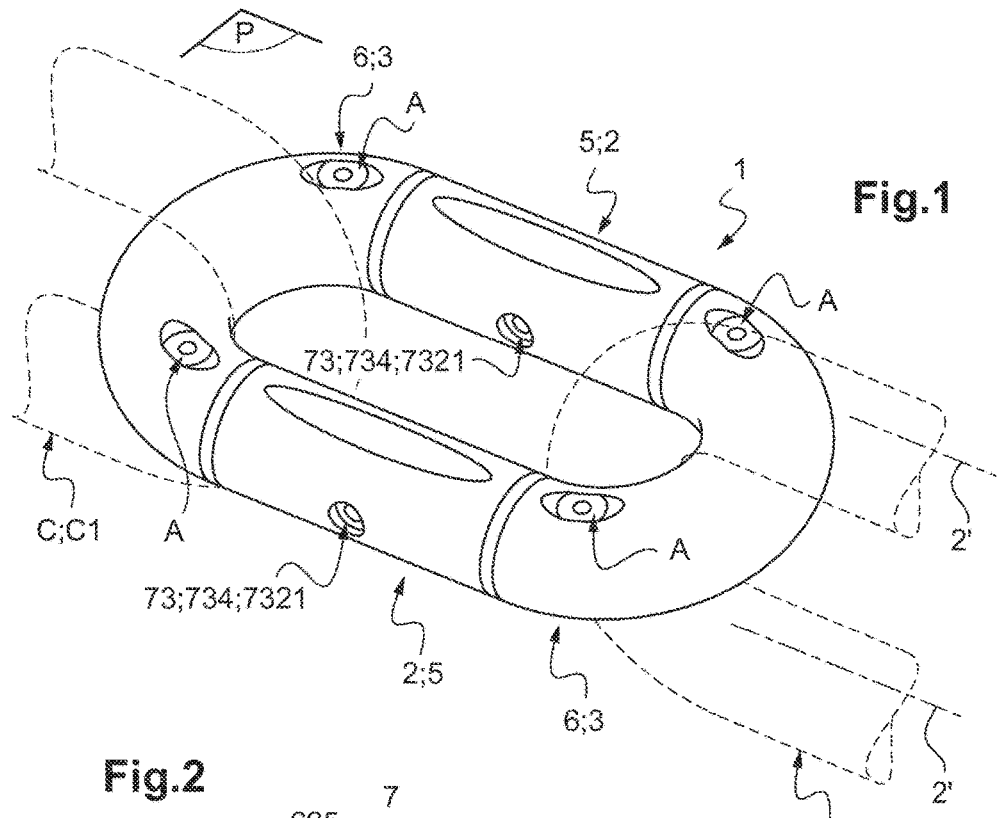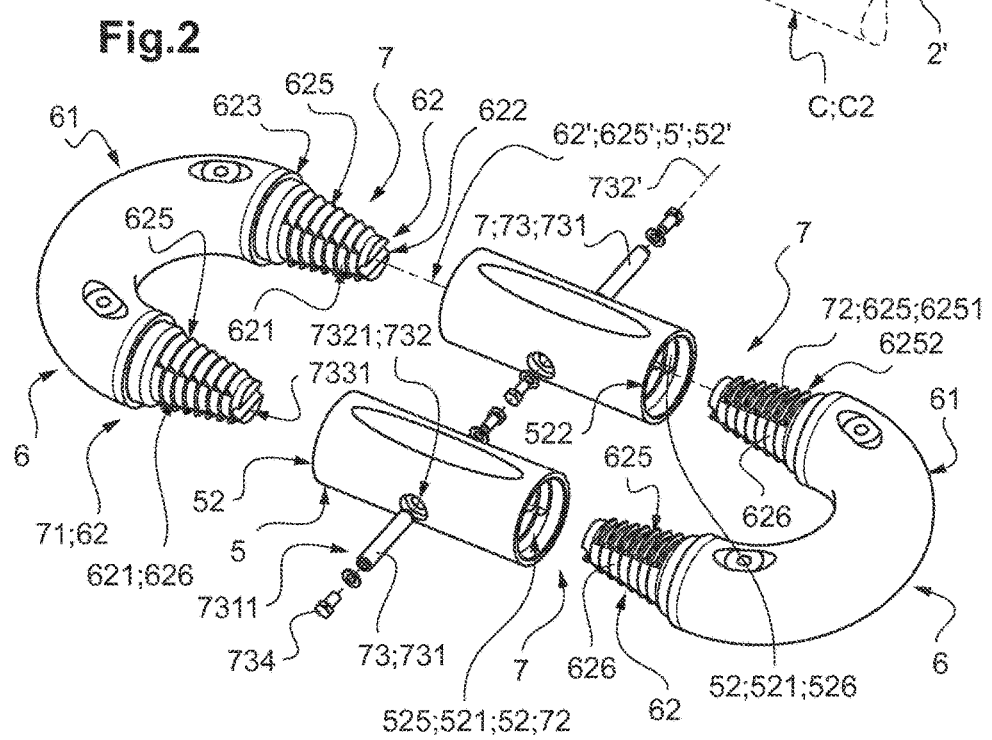

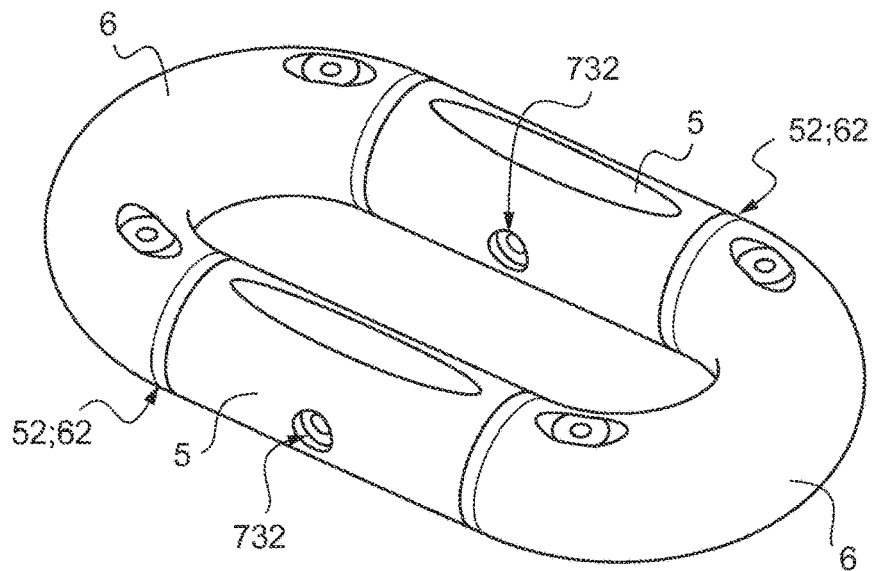
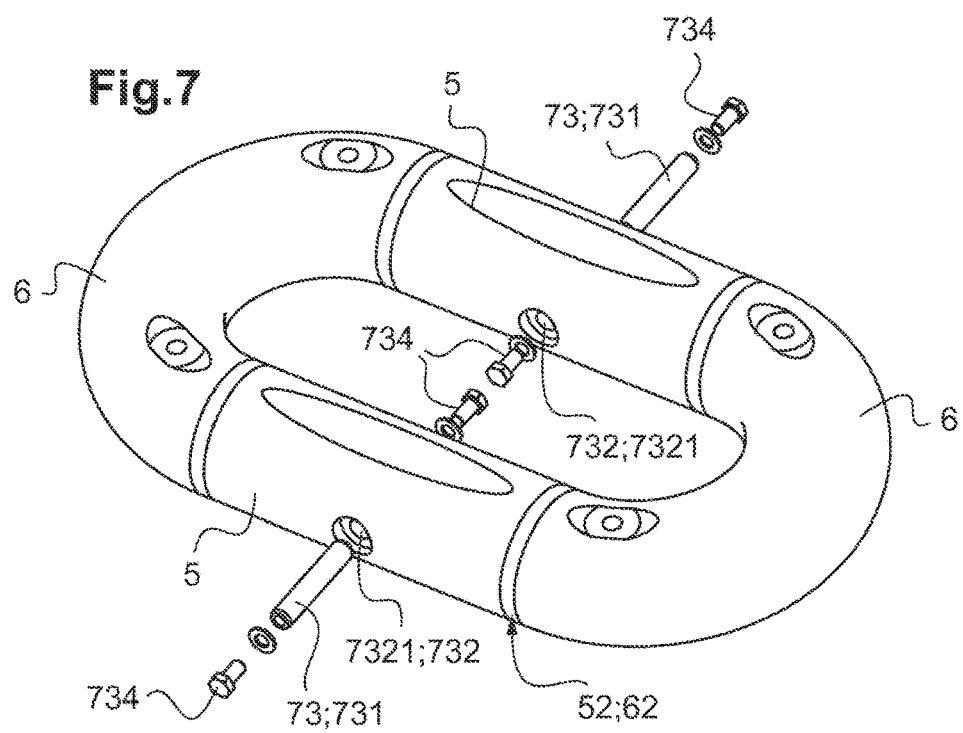

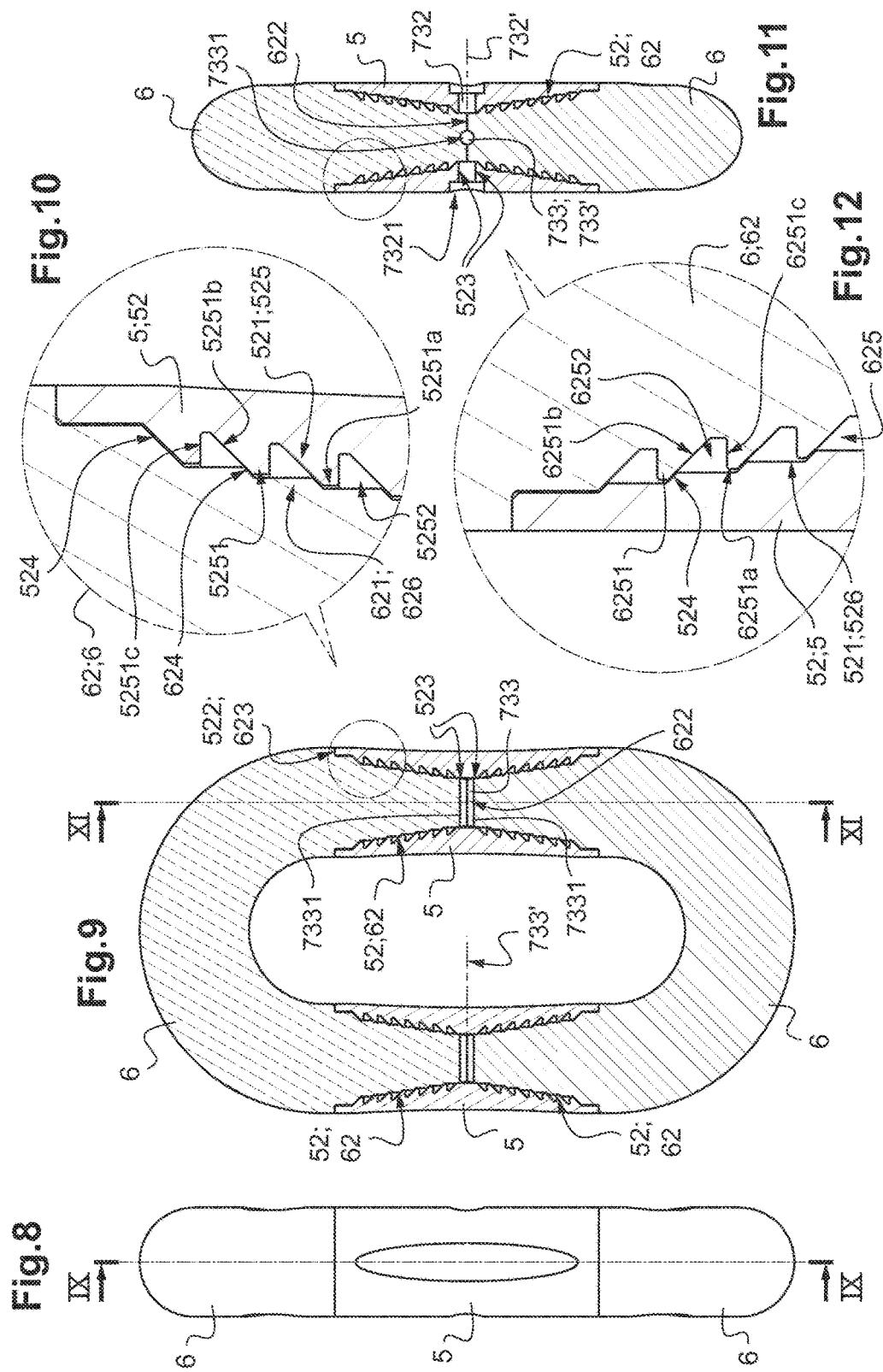

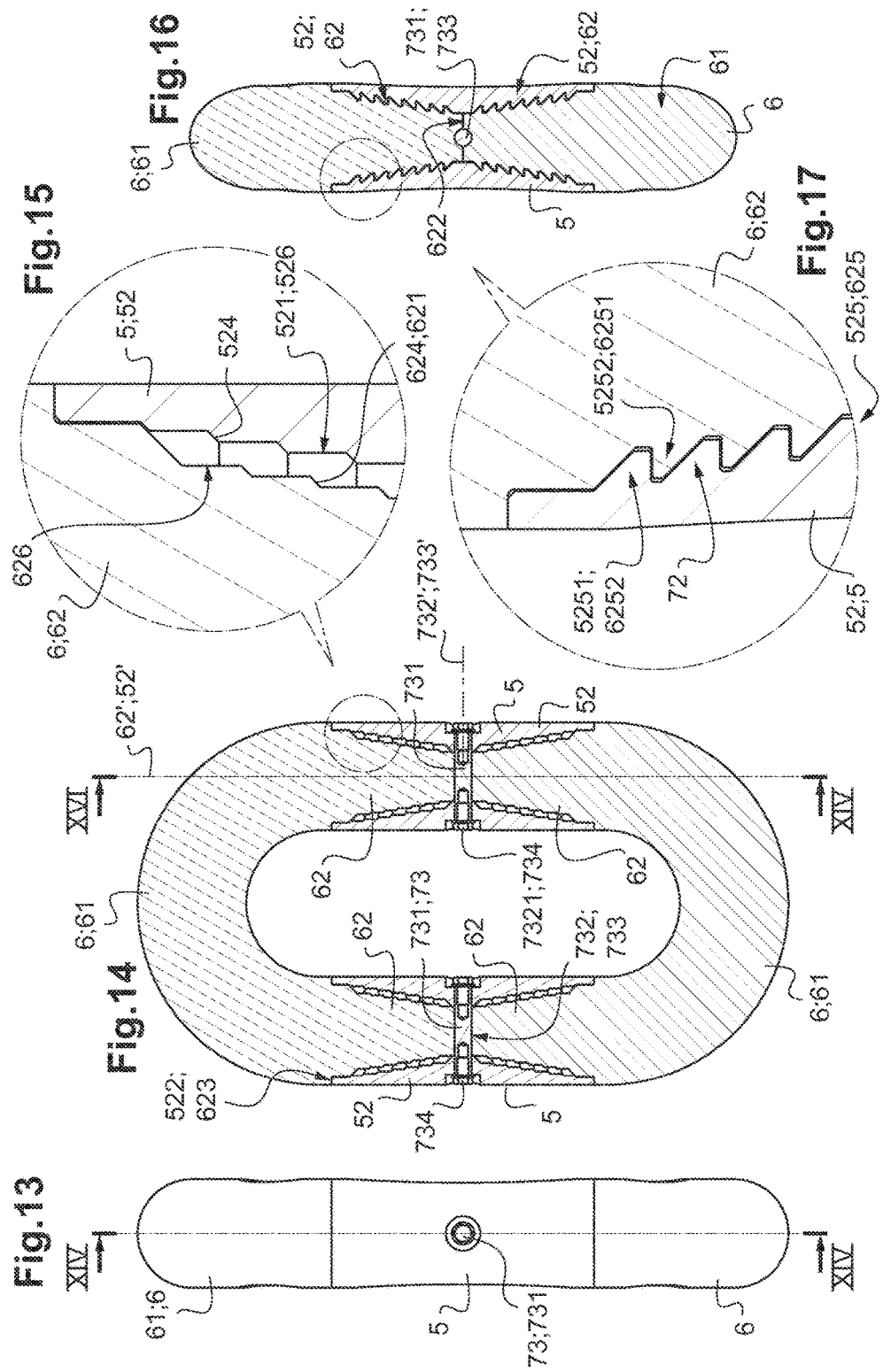

US 10,246,165 B2

DISMANTLABLE LINK, SUITABLE IN PARTICULAR FOR INTERCONNECTING TWO CHAINS FOR ANCHORING FLOATING EQUIPMENT TO THE GROUND

TECHNICAL FIELD TO WHICH THE INVENTION RELATES

The present invention relates to the field of the demountable links, adapted in particular to connect two chains for the anchoring of a floating installation to the ground.

TECHNOLOGICAL BACK-GROUND

Certain industrial fields use chains to attach two elements to each other, in particular for the purpose of anchoring, towing, etc.

For example, certain floating installations, in particular the offshore oil rig platforms, are anchored to the ground by means of anchoring chains (also called "anchoring lines"), of great size.

The lower, downstream end, of each of these anchoring chains includes means for the fixation thereof to the ground, in particular by means of a block buried in the sea floor. The upper, upstream end thereof extends at a control station that is arranged on the side of the floating installation, above the waterline thereof.

Each operation station generally comprises—a tensioner winch, commonly called "cable wheel", to adjust the tension of the anchoring chain, and—activatable/deactivatable stopper means, to lock the tension applied to this anchoring chain.

In practice, it is sometimes necessary to fasten such an anchoring chain with another chain of the floating installation.

For example, to ensure a tensioning of an anchoring chain, the tensioner winch advantageously includes a master chain strand, whose downstream end includes a downstream link adapted to be removably fastened through a demountable link, with a link of the anchoring chain.

Due to the size and weight of the links, this operation of assembly is carried out by one or two operators, and these operators are often led to use an electric winch to assist the lifting of the links and to facilitate the fastening/unfastening operations.

But the present demountable links are not fully satisfying, in particular as regards the facility of assembly and the strength. Moreover, these demountable links have not the same geometry as the links constituting an anchoring chain.

Indeed, so-called "C-links" are often used, which are heavy and complex to handle in mounting/dismounting operations.

There hence exists a need for new structures for demountable links whose ergonomy in mounting/dismounting and strength would be optimized.

OBJECT OF THE INVENTION

The present invention hence relates to a demountable link, adapted in particular to connect two links for the anchoring of a floating installation to the ground.

This demountable link, having the shape of an oblong ring, includes two rectilinear sections connected by two bent sections.

And according to the invention, this demountable link comprises:

- two lateral parts that each form one of said bend sections, and
- two connecting parts, that each form at least one portion of one of said rectilinear sections,
- and said lateral parts are assembled with said connecting parts, through removable fastening means.

Such a link has hence for interest that it can have a standard geometry identical to a studless link, and that it can have a great strength, in particular higher than at least 1.5 times (preferably of the order of 1.7 times) the nominal traction capacity of the traction winch.

According to a preferred embodiment, the two lateral parts are each U-shaped and are each ended by two end portions that extend parallel to each other and that are each intended to extend at one of said rectilinear sections; the two connecting parts are each rectilinear and are each ended by two end portions that extend coaxially to each other and that are intended to extend at the corresponding rectilinear section; and each of said end portions of a connecting part cooperates with one of said end portions of a lateral part, to form an assembly couple in which said end portions are assembled through removable fastening means.

In this case, at each assembly couple, the removable fastening means advantageously comprise:

- means for the translational fitting of the end portions into each other, according to a translation axis parallel to a longitudinal axis of the corresponding rectilinear section,
- means for translationally blocking said fitted end portions relative to each other, which are operable between an active position and an inactive position, and
- means for locking said blocking means in the active position.

Preferably, the end portions of an assembly couple include complementary surfaces, a male one and a female one, that form the translational fitting means; wherein said complementary surfaces are adapted to allow a rotation of the connecting part with respect to the associated lateral part, according to an axis of rotation extending coaxially to the longitudinal axis of the corresponding rectilinear section; the blocking means being operable between the active and inactive positions through said operation in rotation, and the locking means consist in means for the rotational locking in said active position.

In this case, the complementary surfaces have advantageously a circular cross-section and extend coaxially relative to each other.

Still in this case, the translational blocking means advantageously comprise snug/groove couples that are arranged on said complementary surfaces and that are oriented so as to ensure the translational blocking.

These complementary surfaces have preferably complementary truncated-cone shapes; and the snug/groove couples are distributed over at least one longitudinal band of each of said complementary surfaces, said at least one band being oriented in such a manner that its longitudinal axis extends parallel to the longitudinal axis of said complementary surfaces.

The complementary surfaces preferably each include two longitudinal bands of snug/groove couples, said longitudinal bands being arranged in diametrically opposed positions relative to the longitudinal axis of said complementary surfaces.

Generally, the locking means comprise at least one removable indexation element, which is added between at least two coaxial housings:

- a first housing arranged in a connecting part, and a second housing arranged in one at least of the lateral parts.

In this case, the end portions of the lateral parts advantageously each comprise a male surface provided with an end face including a housing portion; these end faces of said lateral parts are intended to come adjacent to each other during the assembly of the link, and their juxtaposed housing portions form together said second housing intended to receive the indexation element.

Preferably, in the active position, the housings each define a longitudinal axis extending perpendicular, or at least approximately perpendicular, to the plane passing through the longitudinal bands of snug/groove couples.

Still preferably, the two lateral parts are identical to each other and the two connecting parts are identical to each other.

DETAILED DESCRIPTION OF THE INVENTION

The invention will also be illustrated, without being limited in any way, by the following description of a particular embodiment of a demountable link, in relation with the appended figures, in which:

FIG. 1 is a general and perspective view of the demountable link according to the invention, once its constitutive portions assembled together;

FIG. 2 is a general and perspective view of the demountable link according to FIG. 1, shown in exploded view;

FIGS. 3 to 7 show the main steps for the assembly of the constitutive parts of the demountable link according to FIG. 1;

FIG. 8 is a side view of the demountable link according to FIG. 1, whose translational blocking means are in the active position;

FIG. 9 is a sectional view of the demountable link of FIG. 8, according to a median sectional plane IX-IX;

FIG. 10 is a detailed and enlarged view of the link of FIG. 9, showing its translational blocking means in the inactive position;

FIG. 11 is also a sectional view of the demountable link, according to a transverse sectional plane XI-XI of FIG. 9 passing through an assembly couple;

FIG. 12 is a detailed and enlarged view of the translational blocking means in the inactive configuration;

FIG. 13 is a side view of the demountable link according to the invention, wherein the translational blocking means are in the active configuration;

FIG. 14 is a sectional view of the demountable link of FIG. 13, according to a median sectional plane XIV-XIV;

FIG. 15 is a detailed and enlarged view of the sectional view of FIG. 14, at the translational blocking means;

FIG. 16 is a sectional view of the demountable link of FIG. 14, according to a transverse sectional plane XVI-XVI passing through an assembly couple;

FIG. 17 is a partial and enlarged view of FIG. 16, showing the translational blocking means in their active position.

Figure 3:
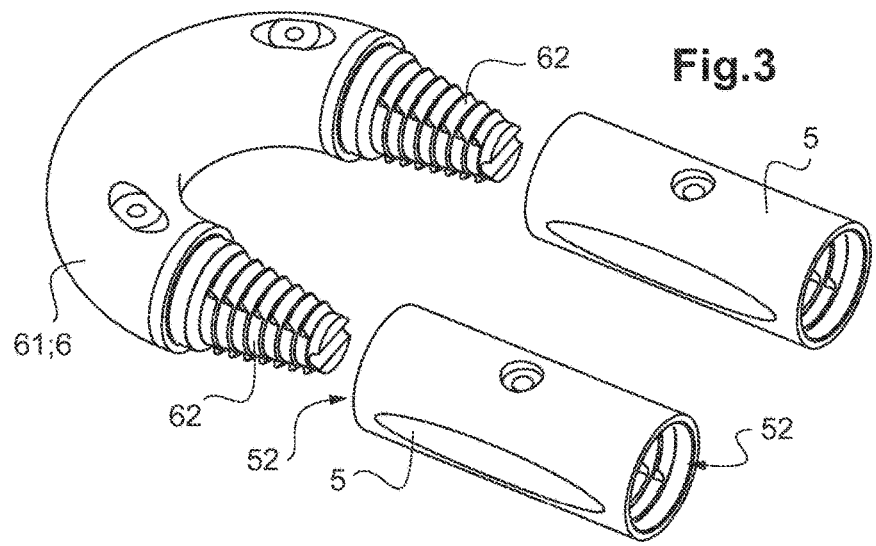

The demountable link 1 ("or demountable ring"), schematically illustrated in FIG. 1, is adapted in particular to connect two chains C, for example two chains for the anchoring to the ground of a floating installation (not shown).

Such a floating installation advantageously consists in an offshore floating installation, for example a floating platform and in particular an oil platform.

The chains C are consisted of a set of metallic links, interlaced two by two.

Within each anchoring chain, the median planes of two links directly associated to each other are intended to extend perpendicular, or at least approximately perpendicular, to each other.

Each link conventionally consists in a studless link or in a stud link.

The demountable link 1 according to the invention is intended to connect two end links (FIG. 1):
 an upstream end link C1, intended to constitute the chain end located on the floating installation side, and
 a downstream end link C2, intended to constitute the chain end fixed to the sea bottom.

The demountable link 1, of the studless link type, has the shape of an oblong ring whose wire extends in a median plane P (FIG. 1).

Such a demountable link 1 includes two rectilinear sections 2, each defining a longitudinal axis 2', connected by two bent sections 3 (FIG. 1).

This demountable link 1 has a standard general shape, identical to a link of an anchoring chain; it has for example the following dimensions: a "wire" diameter of 150 mm, a length of 900 mm and a width of 500 mm.

According to the invention and as shown in FIG. 2, this demountable link 1 comprises a set of four parts (or "pieces" or "work pieces") (in other words, the body of this demountable link 1 is constituted of four parts):
 two connecting parts 5, identical to each other, which each form at least one portion of one of the rectilinear sections 2, and
 two lateral parts 6, identical to each other, which each form one of the bent sections 3.

These parts 5, 6 are herein each made single-piece (machined in the mass).

Herein, the lateral parts 6 each have a U-shape, comprising:
 a curved portion 61, corresponding to one of the bend sections 3 of the demountable link 1, and
 two end portions 62 that are each intended to extend at the end of one of the rectilinear sections 2 of the demountable link 1 assembled.

The curve part 61 includes tapped holes A (FIG. 1), allowing the screwing of a handling ring to facilitate the mounting.

The two end portions 62 each define a longitudinal axis 62', extending parallel to each other.

For their part, the two connecting parts 5 each have a generally rectilinear cylindrical shape, defining a longitudinal axis 5', to form one of the rectilinear sections 2 of the demountable link 1 formed.

Each connecting part 5 is ended by two end portions 52 that are opposite to each other and that are intended to extend at the ends of the corresponding rectilinear section 2.

These end portions 52 each define a longitudinal axis 52', extending coaxially to each other.

For the assembly of the demountable link 1, each of the end portions 52 of a connecting part 5 cooperates with one of the end portions 62 of the lateral part 6, to form an assembly couple 52, 62 (visible in particular in FIGS. 14 to 17).

Herein, the demountable link 1 includes four assembly couples 52, 62 that are each located at the junction between a rectilinear section 2 and a bent section 3.

In each assembly couple 52, 62, the present end portions 52, 62 are assembled through removable fastening means 7 that comprise:
 means 71 for the translational fitting of the end portions 52, 62 into each other, according to a translation axis coaxial to a longitudinal axis 2' of the corresponding rectilinear section 2 and coaxial to a longitudinal axis 5' of the connecting part 5, means 72 for translationally blocking said fitted end portions 52, 62 (FIG. 17), which are operable between an active position (FIGS. 13 to 17) and an inactive position (FIGS. 8 to 12), and means 73 for locking said translational blocking means 72 in the active position (FIGS. 13 to 17).

Firstly, the end portions 52, 62 of an assembly couple 52, 62 include complementary surfaces 521, 621, a male one and a female one, to form the translational fitting means 71.

These complementary surfaces 521, 621 each have a circular cross-section and extend coaxially relative to each other, to allow a rotation of the connecting part 5 with respect to the associated lateral part 6 according to a rotation axis extending, on the one hand, coaxially to the longitudinal axis 2' of the corresponding rectilinear section 2 and, on the other hand, coaxially to the longitudinal axis 5' of said connecting part 5.

Herein, the end portions 62 of the lateral part 6 each include a male surface 621 of generally truncated-cone shape, coaxial to its longitudinal axis 62'.

Each male surface 621 is ended by two ends:
a free end face 622, of small diameter and perpendicular to its longitudinal axis 62', and
an end 623, of great diameter and forming a crown, connected to the curve portion 61.

For their part, the end portions 52 of each connecting part 5 each include a female surface 521 of generally truncated-cone shape that extends coaxially to its longitudinal axis 52'.

Each female surface 521 is ended by two ends:
an outer end 522, of great diameter and forming a crown delimiting the entry of said female surface, and
an inner end 523, of small diameter and herein opening towards the inner end 523 of the other female surface 521 (visible in particular in FIGS. 9 and 11).

Each female surface 521 hence forms a housing that opens at one of the longitudinal ends of the connecting part 5.

Each female surface 521 herein extends, at least approximately, over half the length of the connecting part 5 (visible in particular in FIGS. 9 and 11).

The complementary surfaces 521, 621 each have a shape of the stepped type, with a succession of concentric shoulders 524, 624 distributed over their respective lengths (visible in particular in FIGS. 10 and 12).

As developed hereinafter, this embodiment has for interest to ensure an optimal guiding in rotation of the connecting part 5, herein by cooperation with the translational blocking means 72.

The translational blocking means 72 comprise snug/groove couples that are, on the one hand, formed on the complementary surfaces 521, 621, and on the other hand, oriented so as to ensure the translational blocking of the end portions 52, 62 of each assembly couple 52, 62.

Herein, these translational blocking means 72 are operable between two positions:
an active position, in which the assembled end portions 52, 62, of an assembly couple 52, 62 are translationally blocked, and
an inactive position, in which the assembled end portions 52, 62, of said assembly couple 52, 62 are free in translation.

The transition between these two positions is obtained by a rotational operation of the connecting part 5 with respect to the associated lateral part 6 (as the case may be, with respect to the two associated lateral parts 6), according to the rotation axis extending coaxially to the longitudinal axis 2' of the corresponding rectilinear section 2 and coaxially to the longitudinal axis 5' of this connecting part 5.

For that purpose, the complementary surfaces 521, 621 are each provided with at least one longitudinal band 525, 625 comprising a set of snugs 5251, 6251 that delimit between each other grooves 5252, 6252 opening laterally.

Herein, these complementary surfaces 521, 621 each include two longitudinal bands 525, 625, arranged in diametrically opposed positions with respect to its longitudinal axis 52', 62' (FIG. 2).

Each longitudinal band 525, 625 extends over an angular sector herein corresponding to the quarter of the circumference of the corresponding complementary surface 521, 621.

These longitudinal bands 525, 625 are hence separated by two free ends 526, 626 devoid of snugs, arranged in diametrically opposed positions with respect to its longitudinal axis 52', 62'.

Each longitudinal band 525, 625 is oriented so that its longitudinal axis 525', 625' extend parallel to the longitudinal axis 52', 62' of the corresponding complementary surface 521, 621.

Each longitudinal band 525, 625 has the general shape of a straight tooth serration, whose snugs 5251, 6251 each consist in a tooth whose free edge 5251*a*, 6251*a* extends in a plane perpendicular to the longitudinal axis 52', 62' of the corresponding complementary surface 521, 621 (FIGS. 10 and 12).

Each snug 5251, 6251 also includes two opposite faces:
a front face 5251*b*, 6251*b* that is inclined with respect to the longitudinal axis 52', 62' of the corresponding complementary surface 521, 621, and
a rear face 5251*c*, 6251*c* that extends perpendicularly to the longitudinal axis 52', 62' of the corresponding complementary surface 521, 621.

The front face 5251*b*, 6251*b* of each snug 5251, 6251 of a complementary surface 521, 621 extends in the continuation of an above-mentioned shoulder 524, 624, so as to ensure an optimum guiding in rotation by a cooperation with the front face 5251*b*, 6251*b* of a snug 5251, 6251 of the other complementary surface 521, 621.

As for them, the locking means 73 comprise a removable indexation element 731, herein a cylindrical key, which is intended to be added between the connecting part 5 and the associated lateral parts 6.

This indexation element 731 is intended to be added between two housings 732, 733 extending coaxially when the connecting part 5 is positioned in active position, i.e.:
a first housing 732, arranged in the connecting part 5 and
a second housing 733, arranged in one at least of the lateral parts 6.

The first housing 732 of the connecting part 5 consists in a trough-housing that has a cylindrical section.

This first housing 732 defines a longitudinal axis 732' that extends, on the one hand, perpendicular to the longitudinal axis 5' of the connecting part 5 and, on the other hand, perpendicular to the general plane passing through its longitudinal bands 525.

This first housing 732 is herein located between the inner ends 523 of the two female surfaces 521, in communication with these latter (in particular FIG. 11).

This first housing 732 is open, in addition, on either side of the connecting part 5 for the positioning of the above-mentioned indexation element 731.

As for it, the second housing 733 is formed by the free end faces 622 of the lateral parts 6 that are intended to come adjacent to each other at the assembly of the demountable link 1.

For that purpose, these free end faces 622 each include a part 7331 of the second housing 733, herein of the semi-cylindrical shape (FIG. 2).

This part 7331 of second housing 733 is intended to form the second housing 733, once juxtaposed with the complementary part 7331 of the other free end face 622 (in particular FIG. 11).

The second housing 733 obtained, cylindrical, defines a longitudinal axis 733' extending perpendicular with respect to the longitudinal axis 62' of the end portions 62 of the lateral parts 6 and with respect to the general plane passing through the longitudinal bands 625 of these same end portions 62 (FIGS. 6 and 11).

Figure 4:
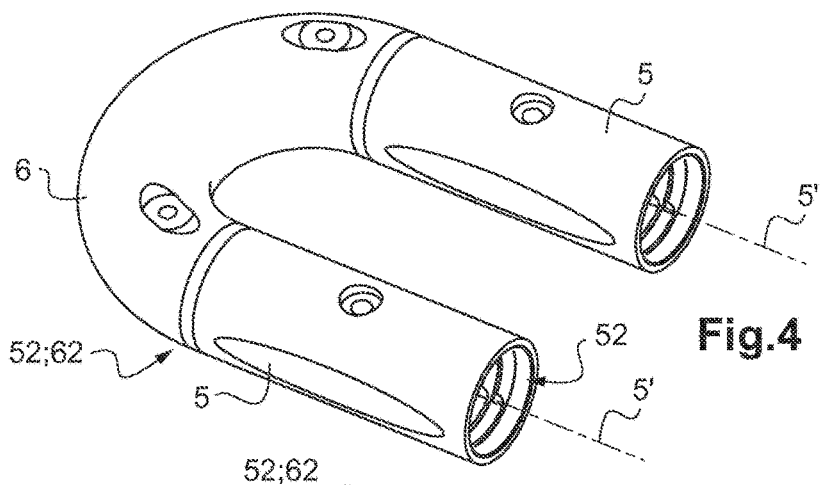

In practice, an operator adds the two connecting parts 5 on one of the lateral parts 6, so that the end portions 62 of this lateral part 6 each cooperate with one of the two end portions 52 of one of the connecting links 5 (FIGS. 3 and 4).

This assembly is obtained by a translational fitting of the complementary end portions 52, 62, according to a translation axis parallel to the longitudinal axis 5' of the corresponding connecting part 5 (and parallel to the longitudinal axis 52', 62' of the corresponding complementary surfaces 521, 621).

The associated end portions 52, 62 constitute an assembly couple 52, 62 including the complementary surfaces 521, 621, a male one and a female one, forming the above-mentioned translational fitting means 71.

The truncated-cone shape of these complementary surfaces 521, 621 participate to an optimal guiding during this translational fitting.

To perform this fitting, each connecting part 5 is moreover oriented angularly so that the longitudinal bands 525 of its end portion 52 to be associated are angularly offset with respect to the longitudinal bands 625 of the end portion 62 of the lateral part 6.

In other words, the longitudinal bands 525 of the female surface 521 each extend in the alignment with one of the longitudinal zones 626 of the male surface 621, and reciprocally (FIGS. 9 to 12).

The second end portion 52 of each of the connecting parts 5 remains free.

It is hence obtained a unit formed of a lateral part 6 associated with two connecting parts 5, each through an assembly couple 52, 62 (FIG. 4).

Before the closure thereof, the demountable link 1 is associated with an upstream link C1 and with a downstream link C2 as described in particular in relation with FIG. 1.

The positioning of the upstream C1 and downstream C2 links is facilitated by the wide opening of this demountable link 1 during the mounting.

Figure 5:
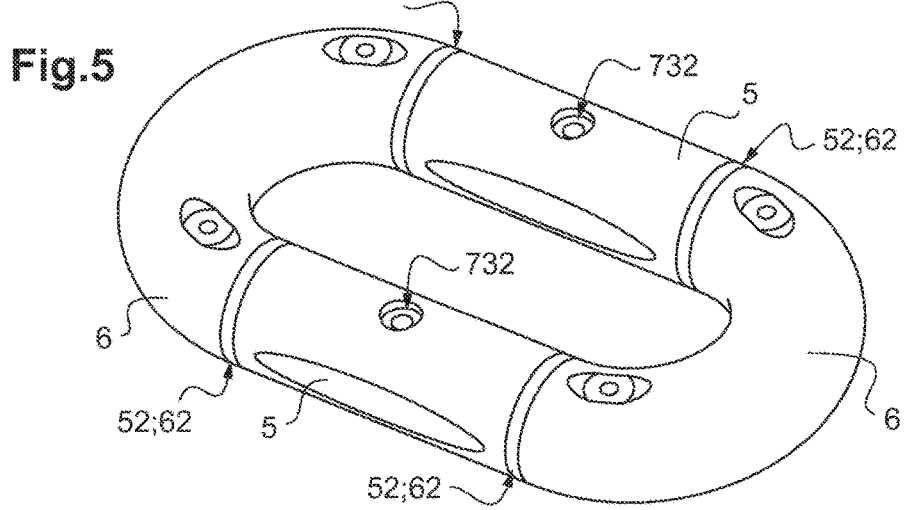

The operator then adds the second lateral part 6 at free end portions 52 of the connecting parts 5, still in inactive position (FIG. 5).

The new associated end portions 52, 62 then also constitute assembly couples 52, 62 including the complementary surfaces 521, 621, a male one and a female one, to also form the translational fitting means 71 (FIGS. 8 to 12).

The terminal faces 622 of the lateral parts 6 are intended to come adjacent to each other during the assembly of the link 1; and the juxtaposed housing portions 7331 form together the second housing 733 intended to receive the indexation element 731.

The translational blocking means 72 are then implemented through a rotational operation of each of the connecting parts 5 with respect to the associated lateral parts 6 (FIGS. 5 and 6).

The two end portions 62 adjacent to the lateral parts 6 then form a kind of whirl guiding the rotation of the connecting part 5.

During this rotation, within each assembly couple 52, 62, one of the longitudinal bands 525 of a connecting part 5 cooperates with a complementary longitudinal band 625 of a lateral part 6 (FIGS. 16 and 17).

Herein, the snugs 5151, 6251 of a longitudinal band 525, 625 come into the complementary grooves 5252, 6252 of the complementary longitudinal band 525, 625 (FIG. 17).

In this active position, the housings 732, 733 each define a longitudinal axis 732', 733' extending, on the one hand, coaxially relative to each other and, on the other hand, perpendicular, or at least approximately perpendicular, to the plane passing through the longitudinal bands 525, 625 of snug/groove couples 5251, 5252, 6251, 6252 (FIG. 14).

In order to lock these translational blocking means 72, the operator implements the active position locking means 73 by introduction of the removable indexation element 731 through the coaxial housings 732, 733 (FIGS. 7 and 14).

The removable indexation element 731 is translationally blocked within the coaxial housings 732, 733.

For example, screws 734 are added at each of the ends 7311 of this removable indexation element 731 (which includes a suitable tapped orifice), to cooperate with the through-ends 7321 of the second housing 732 (that include a bearing shoulder 7321 of the screw heads 734).

The upstream link C1 and the downstream link C2 are hence fastened together through the closed demountable link 1.

Conversely, for the dismounting of this link 1, it is just necessary to:
remove the removable indexation element 731 after the translational unblocking thereof,
rotationally operate the connecting parts 5 to the inactive position, and
space the lateral parts 6 apart from the connecting parts 5.

Generally, the present invention hence consists in a demountable link, which is particularly ergonomic in mounting/dismounting, while keeping an optimum resistance to the efforts.

This link has in addition the interest to have a geometry identical to that of a standard studless link.

The invention claimed is:

1. A demountable link connecting two chains for the anchoring of a floating installation to the ground, the demountable link comprising:
a studless link (1) shaped as an oblong ring, the studless link (1) being comprised of two rectilinear sections (2) connected by two bent sections (3),
the two rectilinear sections (2) being comprised of i) a first connecting part (5) having a first end portion (52) and an opposite second end portion (52), and ii) a second connecting part (5) having a third end portion (52) and an opposite fourth end portion (52),
the first and second connecting parts (5) extending along a respective longitudinal axis (2') and being free of any stud extending therebetween,
the two bent sections (3) comprising a first bent section (3) and a second bent section (3),
the first bent section (3) being comprised of a first lateral part (6) connected to a second lateral part (6), the first lateral part (6) ending in a first end portion (62) and the second lateral part (6) ending in a second end portion (62), the second bent section (3) being comprised of a third lateral part (6) connected to a fourth lateral part (2), the third lateral part (6) ending in a third end portion (62) and the fourth lateral part (6) ending in a fourth end portion (62); and first and second removable fastening parts (7), wherein, the first removable fastening part (7) removably connects the first end portion (62) of the first lateral part (6) of the first bent section (3) within the first end portion (52) of the first connecting part (5), and also removably connects the third end portion (62) of the third lateral part (6) of the second bent section (3) within the second end portion (52) of the first connecting part (5), and the second removable fastening part (7) removably connects the second end portion (62) of the second lateral part (6) of the first bent section (3) within the third end portion (52) of the second connecting part (5), and also removably connects the fourth end portion (62) of the fourth lateral part (6) of the second bent section (3) within the fourth end portion (52) of the second connecting part (5).

2. The demountable link according to claim 1, wherein, the first and second lateral parts (6) together have an overall U-shape, the first and second end portions (62) of the first and second lateral parts (6) extend parallel to each other, the third and fourth lateral parts (6) together have an overall U-shape, the third and fourth end portions (62) of the third and fourth lateral parts (6) extend parallel to each other, the first and second connecting parts (5) extend coaxially relative to each other, and wherein each of said first, second, third, and fourth end portions (52) of the first and second connecting parts (5) cooperate with a respective one of said first, second, third, and fourth end portions (62) of the first, second, third, and fourth lateral parts (6), to form a respective assembly couple (52, 62) in which said first, second, third, and fourth end portions (52) of the first and second connecting parts (5) and said first, second, third, and fourth end portions (62) of the first, second, third, and fourth lateral parts are assembled through the first and second removable fastening parts (7).

3. The demountable link according to claim 2, wherein, each of the first and second removable fastening parts (7) comprise:

translational fitting means (71) for the translational fitting of the end portions (52, 62) of the first and second rectilinear sections and the first and second bent sections into each other, according to a translation axis parallel to the respective longitudinal axis (2') of the corresponding one of the first and second rectilinear sections (2) to thereby form fitted end portions (52, 62), blocking means (72) for translationally blocking said fitted end portions (52, 62) of the first and second rectilinear sections and the first and second bent sections relative to each other, the blocking means being operable between an active position and an inactive position, and locking means (73) for locking said blocking means (72) in the active position.

4. The demountable link according to claim 3, wherein the end portions (52, 62) of each said respective assembly couple include complementary surfaces (521, 621), a male one and a female one, which form the translational fitting means (71), said complementary surfaces (521, 621) being adapted to allow a rotation operation of each of the first and second connecting parts (5) with respect to an associated one of the lateral parts (6) according to an axis of rotation extending coaxially to the longitudinal axis (2') of the corresponding first and second connecting parts (5), wherein the blocking means (72) are operable between the active and inactive positions through said rotational operation, and wherein the locking means (73) comprise means (73) for the rotational locking in said active position.

5. The demountable link according to claim 4, wherein the complementary surfaces (521, 621) have a circular cross-section and extend coaxially relative to each other.

6. The demountable link according to claim 4, wherein the translational blocking means (72) comprise snug/groove couples (5251, 5252; 6251, 6252) that are arranged on the complementary surfaces (521, 621) and that are oriented so as to ensure the translational blocking.

7. The demountable link according to claim 5, wherein the translational blocking means (72) comprise snug/groove couples (5251, 5252; 6251, 6252) that are arranged on the complementary surfaces (521, 621) and that are oriented so as to ensure the translational blocking.

8. The demountable link according to claim 7, wherein the complementary surfaces (521, 621) have complementary truncated-cone shapes, and wherein the snug/groove couples (5251, 5252; 6251, 6252) are distributed over at least one longitudinal band (525, 625) of each of said complementary surfaces (521, 621), said at least one longitudinal band (525, 625) being oriented in such a manner that its longitudinal axis (525', 625') extends parallel to the longitudinal axis (52', 62') of said complementary surfaces (521, 621).

9. The demountable link according to claim 8, wherein the complementary surfaces (521, 621) each include two longitudinal bands (525, 625) of snug/groove couples (5251, 5252; 6251, 6252), said longitudinal bands (525, 625) being arranged in diametrically opposed positions relative to the longitudinal axis (52', 62') of said complementary surfaces (521, 621).

10. The demountable link according to claim 3, wherein the locking means (73) comprise at least one removable indexation element (731), that is added between at least two coaxial housings:

a first housing (732) arranged in each of the first and second connecting parts (5), and a second housing (733) arranged in one at least of the lateral parts (6).

11. The demountable link according to claim 10, wherein the end portions (62) of the lateral parts (6) each comprise a male surface (621) provided with a terminal face (622) including a housing portion (7331), said terminal faces (622) of said lateral parts (6) being configured to come adjacent to each other during the assembly of said link (1), and said juxtaposed housing portions (7331) form together said second housing (733) that receives the indexation element (731).

12. The demountable link according to claim 8, wherein the locking means (73) comprise at least one removable indexation element (731), that is added between at least two coaxial housings:
- a first housing (732) arranged in a connecting part (5), and
- a second housing (733) arranged in one at least of the lateral parts (6),
- wherein in the active position, the housings (732, 733) each define a longitudinal axis (732', 733') extending perpendicular, or at least approximately perpendicular, to the plane passing through the longitudinal bands (525, 625) of snug/groove couples (5251, 5252; 6251, 6252).

13. The demountable link according to claim 8, wherein the end portions (62) of the lateral parts (6) each comprise a male surface (621) provided with a terminal face (622) including a housing portion (7331),
- said terminal faces (622) of said lateral parts (6) being configured to come adjacent to each other during the assembly of said link (1), and
- said juxtaposed housing portions (7331) form together said second housing (733) that receives the indexation element (731),
- wherein in the active position, the housings (732, 733) each define a longitudinal axis (732', 733') extending perpendicular, or at least approximately perpendicular, to the plane passing through the longitudinal bands (525, 625) of snug/groove couples (5251, 5252; 6251, 6252).

14. The demountable link according to claim 1, wherein the first and second lateral parts (6) are identical to each other and wherein the first and second connecting parts (5) are identical to each other.

15. The demountable link according to claim 1, wherein,
- the first and second connecting parts (5) are rotatable with respect to the first and second bent sections between i) an active position, in which the end portions (62) of the lateral parts (6) are translationally blocked with respect to the end portions (52) of the first and second connecting parts (5), and ii) an inactive position, in which the end portions (62) of the lateral parts (6) are free in translation with respect to the end portions (52) of the first and second connecting parts (5), and
- the first and second removable fastening parts (7) each comprise a locking element (73) that respectively locks said first and second connecting parts (5) in said active position.

* * * * *